Nov. 10, 1970 — W. E. WILSON — 3,539,773
ELECTRICAL APPLIANCES FOR HEATING LIQUIDS
Filed Aug. 7, 1967 — 4 Sheets-Sheet 1

Nov. 10, 1970 W. E. WILSON 3,539,773
ELECTRICAL APPLIANCES FOR HEATING LIQUIDS
Filed Aug. 7, 1967 4 Sheets-Sheet 4
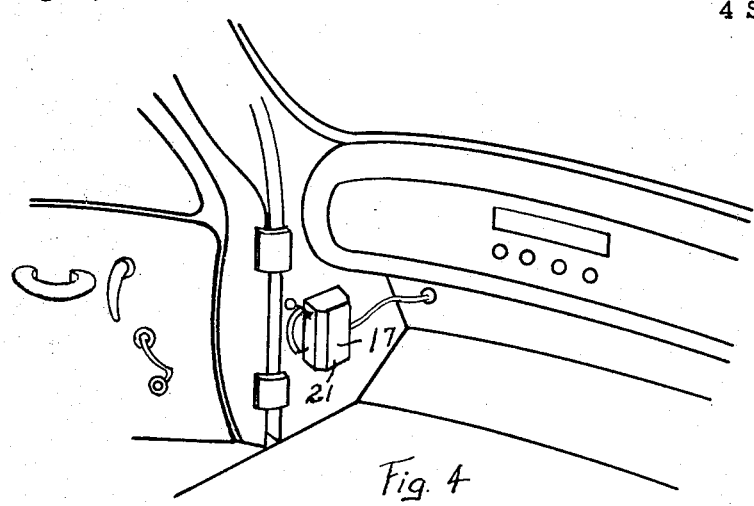
Fig. 4
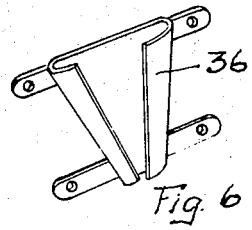
Fig. 6
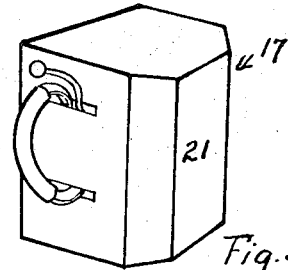
Fig. 5
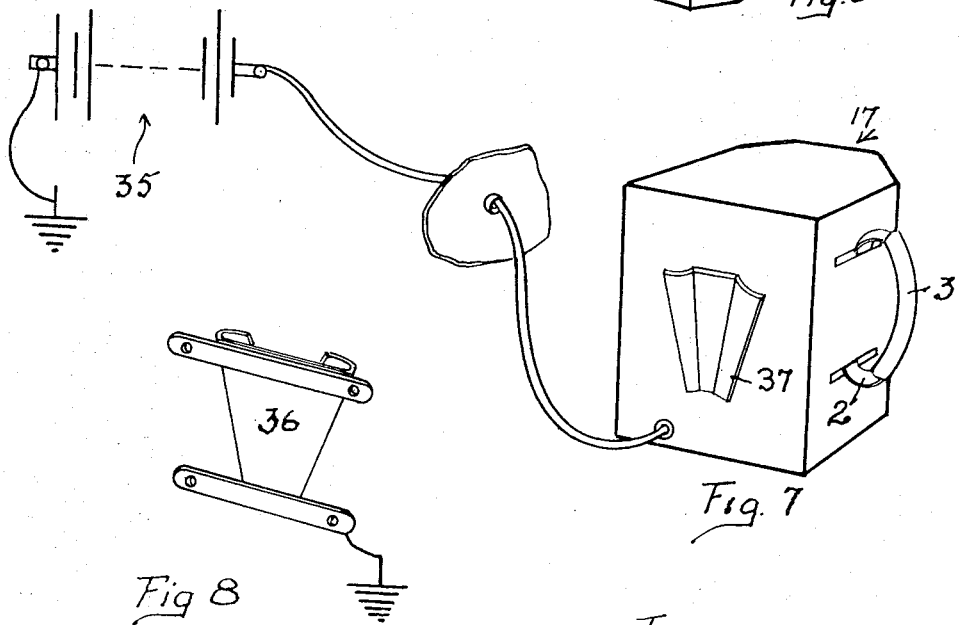
Fig. 7
Fig. 8
Inventor
William E. Wilson
By
Wenderoth, Lind & Ponack
Attys

United States Patent Office 3,539,773
Patented Nov. 10, 1970

3,539,773
ELECTRICAL APPLIANCES FOR HEATING LIQUIDS
William Edward Wilson, 25 Te Awa Kura Terrace, Christchurch, New Zealand
Filed Aug. 7, 1967, Ser. No. 658,884
Int. Cl. H05b *1/02, 3/82*
U.S. Cl. 219—432                                                        7 Claims

ABSTRACT OF THE DISCLOSURE

An appliance for a motor vehicle having a source of electrical power comprising a liquid container having at least one closable opening in the upper part thereof whereby liquid can be placed into and poured from said container. A restricted vent means is provided in the upper part whereby steam can normally escape from within the container. Supporting and retaining means for the container is mounted on the motor vehicle for releasably holding the container and means upon the supporting and retaining means thermally insulate the container from the motor vehicle. An electrical heating element is provided for the container and means for connecting and disconnecting the heating element to said source of electrical power is provided so that liquid within the container may be heated.

---

This invention relates to electrical appliances for heating liquids and more particularly relates to the heating of liquids such as for coffee and tea making by such as travellers and picnickers.

An object of this invention is to provide an electrical appliance for heating liquids which is operable by the conventional electrical systems of motor vehicles.

Another object of this invention is to provide an electrical appliance for heating liquids which is operable from the electrical supply, such as a battery or generator, of a motor vehicle either when such vehicle is stationary or in motion.

According to this invention there is provided an appliance including a liquid container having at least one closable opening in the upper part thereof whereby liquid can be placed into and poured from the container; restricted vent means provided at the said upper part whereby steam can, but liquid cannot, normally escape from within the container; a supporting and retaining means for said container whereby the container can be firmly but releasably held in a motor vehicle; and there being an electrical heating element for the container which is connected or is connectable to, so as to be operable by, the source of electrical power supply of the vehicle, so that liquid placed within the container can be heated as desired.

A preferred embodiment of the invention will now be further described with reference to the accompanying drawings in which:

FIG. 4 is a partial view showing the mounting of the jug in a motor car.

FIG. 5 is a perspective view of the cabinet for the jug.

FIG. 6 is one of the attaching elements for the cabinet shown in perspective.

FIG. 7 is a perspective view showing the electrical connection between the cabinet and the electrical system of the motor car and also the other detachable element for cooperating with the element of FIG. 6.

FIG. 8 is a perspective view indicating schematically the attachment of the element of FIG. 6 to the electrical system.

Figure 3:
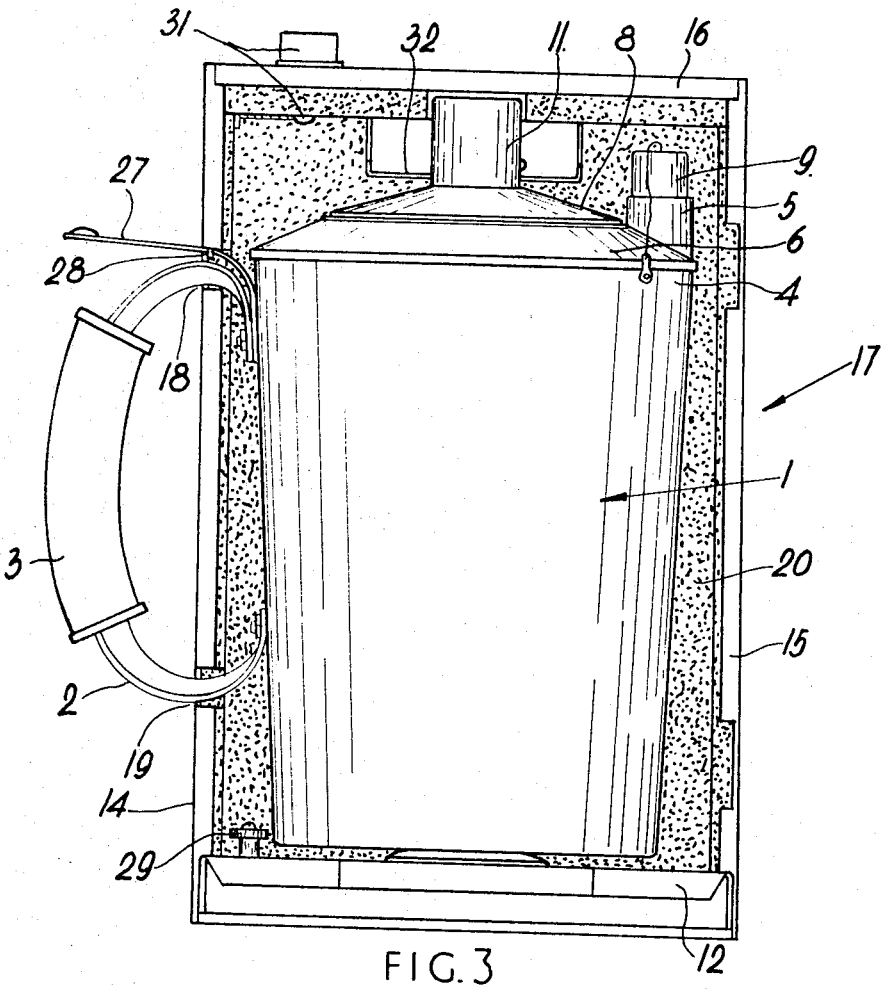
FIG. 3 is a front elevation in cross section on the line III—III in FIG. 2.

The container is a generally upright cylindrical member in the form of a jug 1, with a handle 2 having an insulated hand grip 3 (see FIG. 3) provided on one side thereof and the upper part 4 of the jug 1 being provided with a spout 5 or pouring portion whereby liquid contained within the jug 1 can be poured therefrom as desired.

The upper end of the jug is normally closed by a lid which may be permanently joined to the sides or wall of the jug but in this preferred form is detachable from the jug to facilitate cleaning and/or servicing as may be required.

Figure 1:
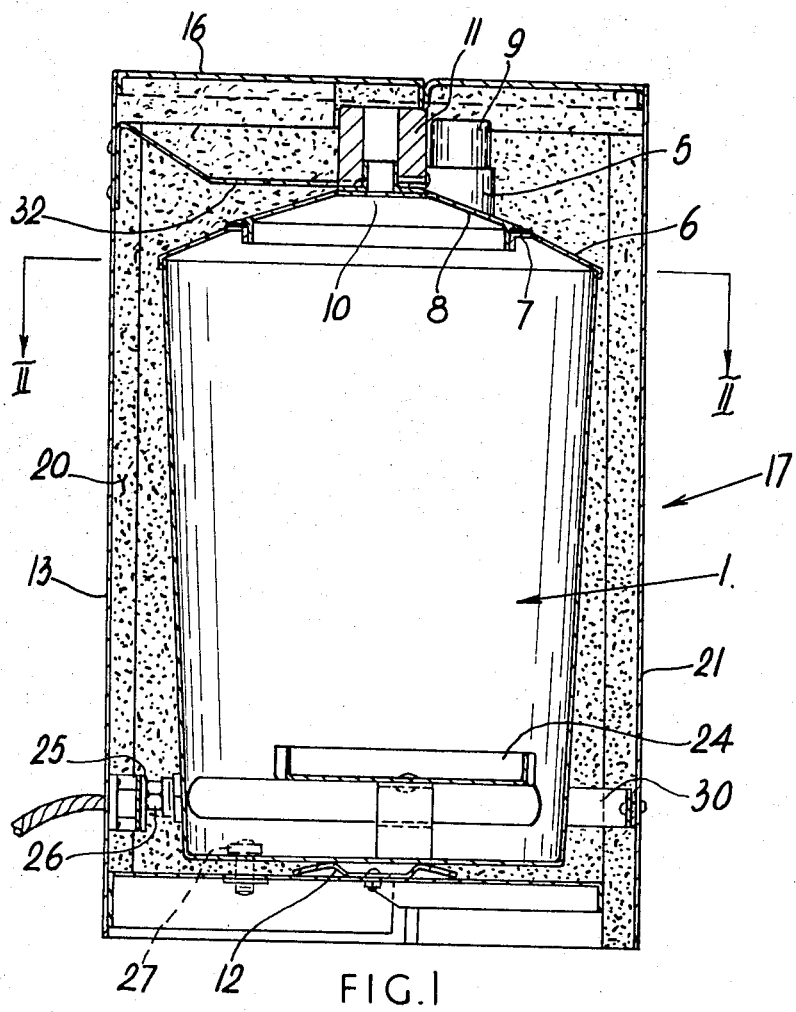
FIG. 1 is a side elevation in cross-section on the line I—I in FIG. 2, with the jug shown in broken lines.

The upper end 4 of the jug 1 is formed with an inturned annular rim 6 leaving a substantially circular hole which is preferably of a diameter not less than one half the diameter of the jug 1 so as to form a lip 7 (see FIG. 1) upon which a lid 8 may seat and be held so that when the jug 1 is in use the upper end thereof is normally closed and sealed. The lid 8 is press fit into the hole and a suitable sealing ring (not shown) such as a rubber or plastics sealing ring may be located between the lid and edge of the hole.

The spout 5 is located on the rim and is provided with a removable stopper 9 (see FIG. 3) so that when liquid is within the jug 1 for heating purposes the spout 5 can be closed to prevent spillage therethrough whilst the motor vehicle is in motion. Liquid can be placed into the jug 1 through the said spout 5 or through the open top of the jug 1 when the lid 8 is removed.

The restricted vent means is arranged to act as a safety valve whereby undue pressure in the jug 1 can be relieved by the escape of steam from the jug as the liquid therein is heated. In this arrangement the restricted vent means is in the form of a small-diameter bore 10 (see FIG. 1) providde in a knob 11 secured centrally of the lid 8 said knob 11 being provided so as to facilitate the removal and replacement of the lid 8. The bore 10 provides communication between the interior of the jug 1 and the atmosphere so that a restricted outlet for steam is provided at the top of the said jug, the arrangement providing that liquid within the jug cannot easily splash out of the jug or be ejected through the said bore.

The supporting and retaining means for the jug 1 may be secured under the bonet of the motor vehicle or in the cab thereof and in this arrangement said supporting and retaining means may comprise a base portion 12 an upstanding rear wall 13, side walls 14 and 15 and a top 16 forming a cabinet 17 which is arranged to accommodate the jug. Side wall 14 is provided with two open ended slots an upper slot 18 and a lower slot 19 (see FIG. 3) so that the handle 2 of the jug 1 can be engaged therein, the said handle, 2 when the jug is in the cabinet, 17 extending exteriorly of the latter so that the jug 1 can be readily lifted out of the cabinet 17.

The cabinet 17 is provided with an insulating and shock absorbing material 20, such as a foamed plastics, lining the interior of the cabinet 17 whereby heat from the jug 1 is not easily lost to the atmosphere and whereby the jug 1 may heat liquid contained therein whilst the vehicle is in motion and the engine of such vehicle is running.

The front wall of the cabinet is formed as a door 21 hinged at 22 to side wall 15 along a vertical edge of the latter. The door 21 is also provided with a lining of the insulating and shock absorbing material 20, and may be held in its closed position by a latch 23 to retain the jug 1 within the cabinet 17 in a shock absorbing manner.

In a preferred form of this invention, the appliance is arranged for mounting within a motor vehicle so that it is not necessary for the driver and/or passenger to get out of the vehicle to attend to the appliance and so that it is not necessary to stop the vehicle to attend to the appliance, other than for the purposes of obtaining liquid for placement in the jug.

Figure 2:
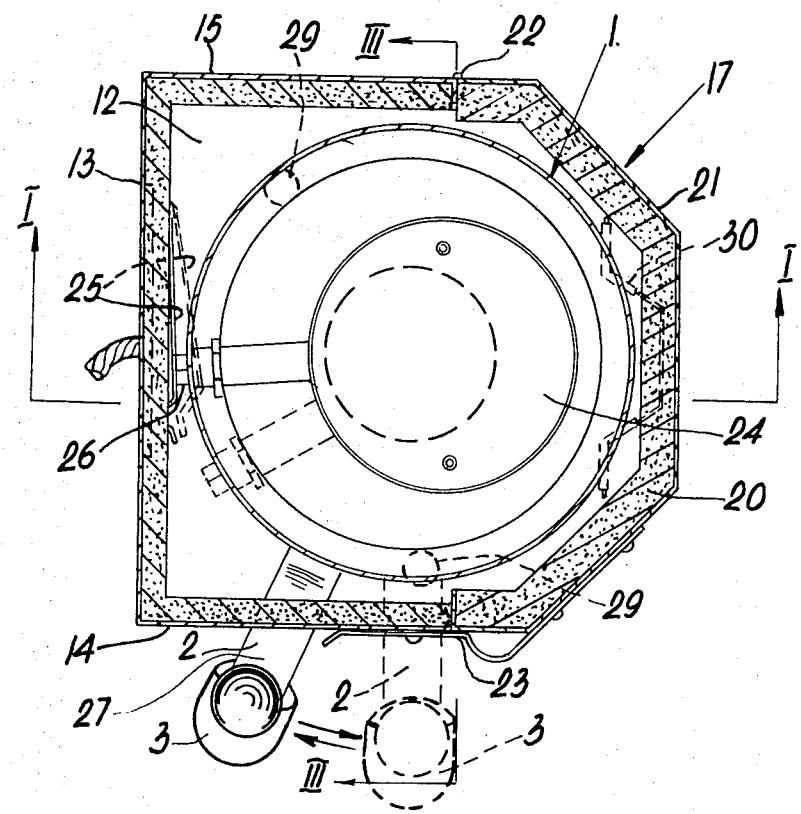
FIG. 2 is a plan view in cross-section on the line II—II in FIG. 1.

In this preferred arrangement, the cabinet can be permanently or detachably securable to the motor vehicle such as under the dash board thereof in a position convenient to the user, the arrangement providing that the handle 2 of the jug 1 will extend through slots 18 and 19 in side wall 14 of the cabinet such slots 18 and 19 being of such a length that the jug 1 may be rotated a few degrees within the cabinet 17 by moving the handle of the jug in the slots for the purpose to be described. The range of movement is as shown by the dotted lines in FIG. 2.

The heating element 24 is of a six or twelve volt type, depending on the voltage of the electrical power supply of the motor vehicle with which it is intended to be used, and in this form of the invention, is located within the jug 1 to heat the liquid directly. Electric power is supplied from the electric power supply source 35 of the vehicle motor to the cabinet 17 and there is an electric terminal 25 positioned within and insulated from the cabinet so as to be engageable with a corresponding electrical contact 26 insulatedly mounted on the outer surface of the jug 1 and connected with the heating element 24 therewithin.

One of the elements for detachably mounting the cabinet to the motor vehicle is shown at 36 while the cooperating element 37 is indicated in FIG. 7.

In an alternative arrangement (not shown) the heating element may be located in or on the base of the cabinet so that heat generated in said element will pass through the bottom of the jug to heat the liquid contained therein. The appliance can be provided with manual or automatic switch mechanism whereby the supply of electricity to the heating element is stopped when the liquid reaches the desired temperature.

In the preferred form of the invention there is a permanent electrical connection between the terminal 25 and the battery or generator of the motor vehicle, said terminal 25 being in the form of a spring loaded or resilient metallic arm. The electrical contact 26 on the jug 1 extends outwardly therefrom and is so placed thereon as to make and break contact with the terminal 25 upon rotation of the jug in one direction and rotation in another direction.

A resilient clip 27 may be provided above the handle 2 of the jug 1 so as to extend through the upper slot 18 in the cabinet 17 when the jug is contained therewithin. A projection 28 (see FIG. 3) extending from the upper edge of the upper slot 18 is substantially medial along the length of the latter may allow the clip 27 to be positively located in either of two positions either side of said projection 28 to thus locate the jug 1 in either of two rotational positions within the cabinet 17.

The contact 26 will thus contact the terminal 25 when the jug 1 is in one position and break contact with the terminal in the other position. By rotating the jug 1 in the cabinet 17 between the positions defined by the clip 27 in the slot 18 the jug 1 may be switched on or off as desired.

Guides in the form of horizontally mounted rotatable wheels 29 may be located on the base of the cabinet so as to locate and steady the jug 1 when the latter is being rotated to open or close the heating element circuit. Further, a spring clip 30 may be located on the door so as to press the jug against said guides 29.

The cabinet 17 is preferably provided with a warning light 31 whch is illuminated while the appliance is in operation or when the liquid contained therein reaches a prescribed temperature. Alternatively, such warning light can be mounted on the dashboard of the vehicle. A forked locating arm 32 may locate the upper end of the jug by accommodating the knob 11 in its fork.

Thus, by this invention there is provided a means whereby picnickers and/or traveller can have ready access to heated liquids or boiled water for liquid for the purpose of brewing beverages such as tea or coffee, and the arrangment providing that the liquid within the appliance can be heated as the vehicle is in motion or whilst the vehicle is standing. It will be appreciated that a particular advantage of this invention is that the appliance can be switch on sometime before reaching a predetermined stopping place so that the water or other liquid is heated by the time such stopping place is reached so as to be readily available for such as tea or coffee making. Furthermore, it will be seen that in the preferred arrangement of the invention the liquid can be heated without the driver or a passenger leaving the vehicle and this is a decided advantage particularly in wet weather or miserable weather conditions where it could be unpleasant to attend to the heating of liquid outside such vehicle.

In a further modification of this invention the jug can be adapted to receive such as a baby's bottle and, by way of example, the jug can have a double wall construction with the liquid contained between the double wall and the bottle being located centrally of the said container and thus, not directly in the liquid being heated.

What I claim and desire to obtain by Letters Patent of the United States of America is:

1. An appliance for a motor vehicle having a source of electrical power comprising a liquid container having at least one closable opening in the upper part thereof whereby liquid can be placed into and poured from said container, restricted vent means in said upper part whereby steam can normally escape from within said container, supporting and retaining means for said container upon said motor vehicle for releasably holding said container, means upon said supporting and retaining means thermally insulating said container from said motor vehicle, an electrical heating element for said container, means for connecting and disconnecting said heating element to and from said source of electrical power so that liquid within said container may be heated, said supporting and retaining means being a cabinet comprising a base portion, upstanding rear and side walls and a front wall formed as a door hinged to one side wall along a vertical edge of the latter, a handle mounted on said container, one of said side walls having substantially horizontally disposed slots to accommodate said handle, said handle being disposed exteriorly of said cabinet when said container is contained therewithin and by moving said handle within said slots relative to said cabinet said container may be caused to rotate a few degrees within said cabinet to operate said means for connecting and disconnecting said heating element to or from said source of electrical power.

2. Apparatus as claimed in claim 1, wherein a resilient clip is provided on the upper portion of said handle so tensioned and placed as to extend through the upper slot of said slots in the side wall of said cabinet bearing against the upper surface of said slot, the upper edge of said slot being provided substantially medial of its length with a projection on the upper surface of said slot such that said container may only be rotated upon pressing said clip downwardly to release it so that said container may be held in either of two rotational positions.

3. An appliance as claimed in claim 2 including at least two rollers mounted adjacent the bottom of said cabinet on vertical axes to assist in the location of said container while the latter is being turned within said cabinet.

4. Apparatus as claimed in claim 3 wherein said connecting and disconnecting means includes a terminal connectable to said source of electric current and insulatedly located in said cabinet.

5. An appliance as claimed in claim 4 wherein said electrical heating element is contained within said container.

6. An appliance as claimed in claim 5 wherein said connecting and disconnecting means further includes an electrical contact insulatedly located on the exterior surface of said container to make and break contact with the temnal upon the rotation of said container.

7. An appliance as claimed in claim 6 wherein said terminal is in the form of a spring tensioned arm.

References Cited

UNITED STATES PATENTS

| | | |
|---|---|---|
| 2,394,333 | 2/1946 | Schneider. |
| 2,518,538 | 8/1950 | Giblin _____ 219—202 X |
| 2,774,524 | 12/1956 | Krause _____ 219—435 X |
| 3,047,186 | 7/1962 | Serio _____ 220—44 |
| 3,254,789 | 6/1966 | Richmond _____ 220—44 |
| 2,861,171 | 11/1958 | Adler _____ 219—432 X |
| 3,423,572 | 1/1969 | Trachtenberg et al. __ 219—437 X |

FOREIGN PATENTS 465,154  8/1951  Italy.

ANTHONY BARTIS, Primary Examiner

U.S. Cl. X.R.

219—202, 435, 437; 220—44